(12) United States Patent
Giefer et al.

(10) Patent No.: US 8,316,734 B2
(45) Date of Patent: Nov. 27, 2012

(54) OPERATING DEVICE WITH A LOCKING ASSEMBLY

(75) Inventors: Andreas Giefer, Lemforde (DE); Ludger Rake, Diepholz (DE); Sascha Rosentreter, Espelkamp (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 382 days.

(21) Appl. No.: 12/745,774

(22) PCT Filed: Dec. 4, 2008

(86) PCT No.: PCT/DE2008/050036
§ 371 (c)(1),
(2), (4) Date: Jun. 2, 2010

(87) PCT Pub. No.: WO2009/071081
PCT Pub. Date: Jun. 11, 2009

(65) Prior Publication Data
US 2010/0257970 A1 Oct. 14, 2010

(30) Foreign Application Priority Data
Dec. 5, 2007 (DE) .......................... 10 2007 058 850

(51) Int. Cl.
B60K 20/00 (2006.01)
B60K 5/00 (2006.01)
B60K 17/04 (2006.01)
B60K 17/12 (2006.01)
G05G 5/08 (2006.01)

(52) U.S. Cl. ................. 74/473.25; 74/473.21; 74/473.12
(58) Field of Classification Search ............... 74/473.12, 74/473.21, 473.23, 473.24, 473.25
See application file for complete search history.

(56) References Cited

U.S. PATENT DOCUMENTS

| 6,382,046 | B1 | 5/2002 | Wang |
| 6,431,339 | B1* | 8/2002 | Beattie et al. ............... 192/220.4 |
| 6,834,563 | B2* | 12/2004 | Seekircher ................... 74/336 R |
| 2003/0188594 | A1 | 10/2003 | Levin et al. |
| 2004/0226801 | A1* | 11/2004 | De Jonge et al. .......... 192/220.7 |
| 2006/0016287 | A1* | 1/2006 | Grossman et al. .......... 74/473.21 |
| 2007/0234837 | A1* | 10/2007 | Russell ...................... 74/473.12 |
| 2008/0028886 | A1 | 2/2008 | Molkow et al. |
| 2008/0295633 | A1 | 12/2008 | Giefer et al. |

FOREIGN PATENT DOCUMENTS

| DE | 404 452 | 10/1924 |
| DE | 100 59 383 A1 | 6/2002 |
| DE | 10 2005 023 926 A1 | 11/2006 |
| DE | 10 2005 033 510 A1 | 2/2007 |
| DE | 10 2007 019 465 A1 | 10/2008 |
| JP | 7 019334 A | 1/1995 |
| WO | 2007/009415 A1 | 1/2007 |
| WO | 2008/116874 A1 | 10/2008 |

* cited by examiner

Primary Examiner — Justin Krause
(74) Attorney, Agent, or Firm — Davis & Bujold, PLLC (57) ABSTRACT

An operating device for selecting gear ratios of a transmission. The operating device comprises a selector lever that is movable between at least three gear selection positions and a locking device for limiting the range of motion of the selector lever. The locking device has a cantilever assembly with a plurality of locking contours that are connected to the selector lever. Each locking contour is assigned to a selector lever position and can be engaged with locking element to form a motion stop for the selector lever. It is thus possible to implement even complex locking tasks in a structurally simple manner such that jams, that occur during actuation, or undefined operating states in the locking device can be prevented. The range of motion of the selector lever is largely freely controlled using an actuator control, and the device is relatively silent and has short shifting times.

11 Claims, 5 Drawing Sheets

Fig. 5

OPERATING DEVICE WITH A LOCKING ASSEMBLY

This application is a National Stage completion of PCT/DE2008/050036 filed Dec. 4, 2008, which claims priority from German patent application serial no. 10 2007 058 850.1 filed Dec. 5, 2007.

FIELD OF THE INVENTION

The invention relates to an operating device for a gear shifting transmission, e.g. for an automatic transmission having shift-by-wire actuation.

BACKGROUND OF THE INVENTION

Gear shifting transmissions of motor vehicles are usually shifted or controlled using an operating device disposed within reach of the driver. Actuating elements such as shift levers or selector levers are used customarily for this purpose, and are disposed between the front seats of the motor vehicle, for example.

In regards to modern operating devices, a particular requirement for the driver is to be provided with a realistic feel for the actuation of the transmission, for reasons of safety and ergonomics. It is therefore necessary that the driver be provided with visual feedback as well as clear haptic or tactile feedback regarding the current gear state or operating state of the transmission.

In regards to shift-by-wire-controlled gear shifting transmissions in particular—which also include most current automatic transmissions—it is required, for ergonomic and safety reasons, that the driver be provided with visual and haptic signals that certain gear states or shift operations are not permitted at a particular moment in the form of blocking the corresponding actuating positions of the selector lever.

When gear shifting transmissions are actuated electrically or using shift-by-wire, which is becoming increasingly more common, the selector lever in the passenger compartment and the motor vehicle transmission in the engine compartment are not mechanically coupled. Instead, in the case of "shift-by-wire" transmissions, the shift commands are transmitted from the operating device to the motor vehicle transmission using electrical or electronic signals, and the shift commands are then usually implemented at the transmission using electro-hydraulics.

In shift-by-wire-controlled gear shifting transmissions, however, the absence of a mechanical connection between the transmission actuator system and the selector lever leads to the result that the transmission state or any shift locks that have been engaged in the transmission can no longer react directly to the state of the selector lever. Since certain gear positions are not noticeably blocked at the selector lever, the driver is unable to easily recognize that some lever positions, gear selection positions, or transmission states may not be permitted in the current drive state and therefore cannot be selected.

Depending on the state of the gear shifting transmission to be operated, and depending on other state factors of the motor vehicle—ignition switched on, engine running, vehicle speed, etc.—in order to implement haptic feedback in shift-by-wire-controlled transmissions, it is therefore generally necessary to limit the range of operation of the selector lever in an actuator-controlled manner depending on the transmission state. In this manner, when the driver reaches for the selector lever, he can recognize in a haptically noticeable manner—even with a shift-by-wire transmission—that his shift request is not permitted and is therefore blocked, for example due to the current operating state or driving condition of the motor vehicle, or due to the current operating state of the gear shifting transmission.

The interrelationships described herein are also of particular significance in regards to monostable operating devices for shift-by-wire transmissions. Monostable selector levers are frequently used with by-wire-controlled transmissions since complex actuator systems can be eliminated that are otherwise used to reposition the selector lever if an automatic state change happens to occur in the transmission, for example if the parking lock is automatically engaged (Auto-P).

In the case of a monostable operating device, the selector lever has one stable (center) position and usually a plurality of non-stable positions in various directions starting from the stable (center) position. Depending on the transmission state, however, usually only a few of all of the mechanical selector lever positions that are available are even feasible for the particular actual shift operation. Other selector lever positions that are indeed mechanically possible for the selector lever to attain, however, cannot or should not—depending on the transmission state—trigger a meaningful shift operation, and must therefore be blocked using actuators to provide the driver with a consistent haptic sensation at the selector lever and with reliable feedback about any shift locks.

For example, if the transmission is in the "parking lock" state, a monostable selector lever must be prevented from being moved further forward—relative to the direction of travel—even if the selector lever could indeed be moved out of its center position and moved freely, at first, in the forward direction. Instead, an appropriate actuator system must ensure that the selector lever in this example can only be moved backward relative to the direction of travel.

As is apparent in US 2006/0016287 A1 or DE 10 2005 033 510 A1, for example, attempts have been made to correct this problem by equipping selector levers of shift-by-wire-controlled gear shifting transmissions with multiple-action actuators, and with appropriate lever elements or transmission elements to selectively block impermissible shift commands. These actuators and the lever elements or transmission elements thusly controlled are shifted depending on the vehicle state or transmission state to thereby limit the original overall range of motion of the selector lever corresponding to the current driving condition or transmission state, or to block the selector lever entirely in certain cases.

However, if a plurality of different selector lever positions in different combinations must be blocked using actuators, or if the range of motion of the selector lever must be positioned variably within an angular range, then, according to the prior art, a complex locking mimicry is often required for this purpose. This has unwanted consequences, due to the complexity and increased costs associated therewith. A conventional locking actuator system of this type can also encounter problems in terms of the construction space available in the region of the operating device. Furthermore, the locking devices known from the prior art tend to produce considerable noise levels and due to the relatively slow shift times of the locking devices can result in certain situations in the problem of one of the selector lever locks being overshot and, associated therewith, the problem of undefined operating states of the operating device occurring.

SUMMARY OF THE INVENTION

Proceeding from this background, the object of the present invention is to create an operating device having a locking device, in particular for the electrical or electronic shift-by-wire actuation of a gear shifting transmission, with which the stated disadvantages of the prior art can be overcome. In particular, the locking device should have a simple design, even when the locking logic is complex, rapid shifting times and minimal noise production should be attained, and undefined operating states and jamming of the selector lever should be reliably prevented. Furthermore, the operating device should require as little construction space as possible.

Considered at first on its own, in the known manner, the operating device according to the present invention includes a shift lever that can be moved within at least one shift gate and has at least three gear selection positions, and includes a base and a locking device. The locking device is used to controllably limit the range of motion of the shift lever, to exclude certain shift lever positions, or to block the shift lever, in particular depending on the gear state of the transmission or the driving condition of the motor vehicle.

However, according to the invention, the operating device is characterized in that the locking device includes a cantilever assembly that is connected to the selector lever and includes a plurality of locking contours. Each locking contour of the cantilever assembly is assigned to a selector lever position, and each of the locking contours can be engaged with one actuator activated locking element such that the locking contour and the locking element form a movement stop for the selector lever.

Compared to the prior art, from which operating devices are known that include actuators having either a plurality of operating positions (such as double-acting electromagnets), servoelectrical transmission actuators, or transmission ratio elements, the invention enables in particular a reduction in the noise level associated with the actuation of the locking device, faster reaction times of the locking device, and a greater reliability that a lock will not be accidentally overshot, resulting in undefined operating states of the operating device.

Initially, the invention can be implemented regardless of how the locking elements and the associated actuator system are implemented and designed. For example, it is conceivable to implement the locking actuators as hydraulic or pneumatic cylinders, or as electromotive actuators. According to a particularly preferred embodiment of the invention, however, the locking elements are formed by extendable bolts of actuators, wherein each of the locking elements is preferably formed by the movable armatures of electromagnets. This results in a particularly compact design of the operating device, a particularly low mass of the locking elements, and, therefore, particularly fast reaction times and a high level of protection against jamming or unwanted overshooting of locks.

According to a further preferred embodiment of the invention, the cantilever assembly is designed as one-piece with the shank of the selector lever. This embodiment also results mainly in a particularly cost-favorable, robust, low-mass, and compact design of the operating device.

According to a further preferred embodiment of the invention, a cross slide is provided that is displaceable transversely to the main direction of actuation of the selector lever. The cross slide includes a slot that encloses the selector lever in the base region of the operating device, whereby the selector lever is freely movable relative to its main direction of actuation relative to the cross slide; motions executed transversely to the main direction of actuation of the selector lever are transferred via the longitudinal edges of the slot to the cross slide. Furthermore, the cross slide can be blocked by a locking actuator of the operating device.

In this manner, the invention can be expanded to operating devices or selector levers having a plurality of shift gates, in particular to those having a selection gate and a tip gate. Due to the actuator blockable cross slide that encloses the selector lever with its slot, so that the cross slide is actuated in a pushing manner via transverse motions of the selector lever between its shift gates, the motion of the selector lever out of the selector gate and into the tip gate can be blocked using actuators. This is significant, in particular, if switching between automatic operation and tip operation should not be permitted due to the current driving condition of the motor vehicle or due to the current operating state of the transmission. The locking actuator associated with the cross slide is likewise preferably designed as an electromagnet having an extendable armature pin. Preferably, the armature pin can be engaged directly in at least one of the corresponding recesses in the cross slide to block the cross slide.

According to a further preferred embodiment of the invention, the operating device includes an actuator device for returning the selector lever from the tip gate to the selection gate. Due to this embodiment, it can be avoided that the selector lever—if the parking lock has been engaged automatically (Auto-P) and, simultaneously, the selector lever remains in the tip gate—is located in a position that does not coincide with the "parking lock" transmission state the next time an attempt is made to drive the vehicle.

If the selector lever was left in the tip gate, the selector lever position would no longer coincide with the actual gear state of the transmission. When the driver would return to the vehicle or attempt to start the vehicle, the position of the selector lever that the driver would observe would provide him with incorrect information. On the basis of his observation of the selector lever position, the driver would have to assume that the transmission is engaged in a gear selection position, although the transmission is actually engaged in the parking lock.

Therefore, to prevent the driver from being misinformed in this manner, an additional signal device would have to be provided especially for the driver, that, if the parking lock had been engaged by Auto-P, would signal to the driver that the selector lever must first be moved manually into the monostable position before the vehicle can be started.

The actuator device for returning the selector lever preferably includes a segment worm gear or a spindle gear. In this manner the actuator device can be designed to be particularly space-saving while simultaneously having a high gear ratio. As a result, in particular, a small electric motor can be used to drive the actuator device, and further gear stages for the actuator device may possibly be eliminated.

According to a further embodiment of the invention, the actuator device includes a spring-loaded freewheel. The freewheel and the freewheel spring act in the direction of actuation of the actuator device.

In this manner, malfunctions of or damage to the actuator device can be prevented if the selector lever should be held in the tip gate or become blocked by an object in the tip gate, while the selector lever is returned automatically out of the tip gate and into the selection gate using the actuator device. In this case, instead of the selector lever being returned immediately from the tip gate to the selection gate, the actuator device only preloads the freewheel spring, and the freewheel is disengaged. As soon as the selector lever is released or the blockage of the selector lever is removed, the selector lever returns to the selection gate due to the spring energy stored in the freewheel spring.

Proceeding, in particular, from the initially described, variable positionability of a certain range of motion of the selector lever (by actuatorically blocking the particular selector lever positions that are located outside of the desired range of motion), it is provided according to a further, particularly preferred embodiment of the invention that the selector lever is designed to be monostable.

This means primarily that the selector lever is returned via spring loading to the same center position after every shift operation. A monostable selector lever is an advantage most notably for operating shift-by-wire-controlled transmissions since this makes it possible to eliminate repositioning of the selector level by the motor e.g. if transmission gear states are automatically engaged, for example if the parking lock is automatically engaged per "Auto-P". Instead, when monostable selector levers of this type are used, it is primarily necessary only to reposition or update the display of the transmission gear state, and to adapt it to the current transmission state.

For the driver, however, this means that he must rely exclusively on the separate display, and its light-emitting diodes or display icons, for example, to know the actual gear state of the transmission. When a monostable selector lever is utilized, however, the driver is unable to obtain visual or haptic feedback about the gear state of the transmission based solely on the position of the selector lever.

Another complex feature of the monostable selector levers known from the prior art is the implementation of the correct mechanical shift logic, that is, the mechanical implementation of the particular permissible range of angular motion of the selector lever. The use, according to the invention, of a locking device having a cantilever assembly and a plurality of locking contours provides advantages in this case as well. That is, due to the separately activatable locking element of each locking contour, the particular permissible range of motion of the selector lever can be positioned in a variable manner within the entire range of motion that is mechanically feasible by blocking the particular selector lever positions that do not belong to the range of motion.

The latter is significant for a monostable selector lever in that the center position, to which the selector lever always returns automatically after having been operated, can be assigned to any actual gear state of the transmission. In particular, the selector lever that remains in its stable center position can basically stand for any of the standard transmission gear states, i.e. "P", "R", "N" or "D". The driver is informed about which gear state the transmission is actually in merely by way of a variable display device on the selector lever or on the vehicle dashboard.

Due to the use, according to the invention, of a locking device having a cantilever assembly and a plurality of locking contours and associated locking elements, it is possible even with a monostable selector lever to depict the behavior of a common multistable selector lever having a plurality of stable selector lever positions based on the fact that the range of motion of the selector lever depends on the actual gear state that has been engaged in the transmission. If the parking lock has been engaged in the transmission, for example, a conventional selector lever cannot be moved a single step forward, but, in general, it can be moved two to four steps backward before it reaches the stop of the operating device, which is opposite the parking lock position, or before it comes to a stop against the opposite end of a selector lever gate.

Due to the invention, this behavior, which contributes to the intuitive usability and haptic detectability of the transmission state, can be implemented using a relatively simple design even in a monostable selector lever by displacing—by activating the particular locking elements—the currently permissible range of motion of the selector lever respectively within the entire structural range of motion of the selector lever such that the selector lever can only move in the direction that corresponds logically to the transmission drive state that is engaged, and such that only that number of fixed gear ratios is possible that corresponds logically to the transmission drive state that is engaged.

Finally, according to a further embodiment of the invention, the locking contours include elastomeric stop dampers e.g. in the form of elastomeric inserts or injection moldings in the region of the locking recesses. As a result, particularly good noise damping of the shifting, actuating, and locking procedures is attained.

BRIEF DESCRIPTION OF THE DRAWINGS

The invention is explained below in greater detail with reference to drawings that merely depict examples of embodiments. They show.

DETAILED DESCRIPTION OF THE PREFERRED EMBODIMENTS

Figure 1:
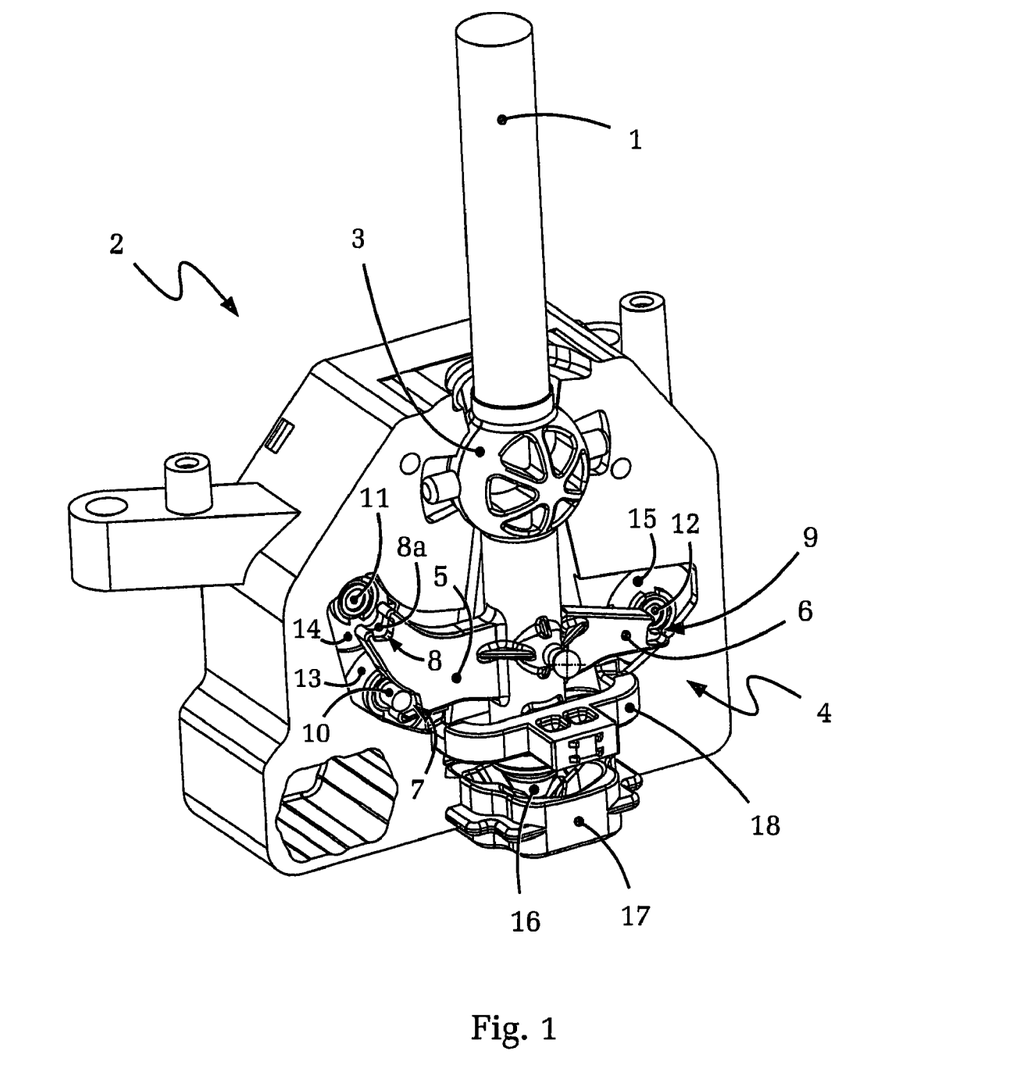
FIG. 1 a schematic, isometric view, of one embodiment of an operating device according to the present invention.

FIG. 1 shows, in a schematic, isometric depiction, one embodiment of an operating device according to the present invention. Selector lever 1 and base housing 2 of the operating device are clearly shown. The right housing half, relative to the direction of travel, was removed from base housing 2 to show pivot support 3, which is disposed in housing 2, for selector lever 1, and to show locking device 4 which is likewise disposed in base 2.

It can be seen that locking device 4 includes a cantilever assembly comprising two cantilevers 5, 6. Cantilevers 5, 6 have locking contours 7, 8, 9, wherein cantilevers 5, 6 and, therefore, locking contours 7, 8, 9 are formed as one-piece with selector lever 1.

Locking elements or locking armatures 10, 11, 12 having shapes that match those of locking contours 7, 8, 9 are provided, wherein locking elements 10, 11, 12 are formed by the axially displaceable armatures of electromagnets 13, 14, 15.

Armatures 10, 11, 12 can be extended axially individually by electromagnetic actuators 13, 14, 15, thereby forming in each case, together with respective associated locking contour 7, 8, 9, individually activatable locking stops for selector lever 1. To obtain particularly good noise damping, locking contours 7, 8, 9 in the embodiment shown are each provided with elastomeric inserts (see e.g. insert 8*a* in locking contour 8; similar inserts are likewise provided in the other locking contours 7 and 9).

In the embodiment shown, the two locking contours 7 and 9 and associated locking armatures 10 and 12 are used to limit the swivel range of selector lever 1 in the center position of selector lever 1 shown in FIG. 1. In other words, selector lever 1 can be completely blocked in the center position shown if both the locking armature 10 and the locking armature 12 have been activated and extended. The locking of selector lever 1 in the center position can correspond functionally to the shift lock, for example, in which the selector lever remains locked in the center position (which now represents the parking lock position) until the ignition is switched on and the brake pedal is depressed. If the shift lock is activated, the selector lever is preferably likewise blocked temporarily from being swiveled between the selection gate and the tip gate; where cross slide 18 and associated locking actuator 29 are used for this purpose, see FIGS. 4 and 5.

Locking contour 8 and associated locking armature 11 form a further stop for selector lever 1. Stop 8, 11 becomes effective when selector lever 1 is moved one gear selection position forward relative to the direction of travel (to the right in the drawing), provided that the associated locking armature 11 is extended. As a result, the range of motion of selector lever 1 in the forward direction is reduced or limited accordingly. It is hereby possible e.g. to prevent the reverse gear from being selected during driving if the transmission is in the "D", Drive, operating position. Further stops—in addition to the static end stops of selector lever 1 on housing 2, which are present anyway, and in addition to the three stop positions that are present in the embodiment shown—could be implemented in a similar manner for further angular positions of selector lever 1 by arrangement of further locking contours and locking armatures.

In FIG. 1 it can also be seen that interlock pin 16 which is movably situated in the lower end of selector lever 1, under spring preload in the axial direction of the selector lever. The (not-shown) end of interlock pin 16 is accommodated in a notched gate 17. In combination with the shape of notched gate 17, the interior of which is substantially funnel-shaped, the spring loading of interlock pin 16 causes selector lever 1 to return from any position within one of the selector lever shift gates to its center position.

Furthermore, FIG. 1 also shows cross slide 18 which is used to block the lateral swivelling motion of selector lever 1 between the selection gate and the tip gate. Cross slide 18 is described in greater detail with reference to FIGS. 4 and 5.

Figure 2:
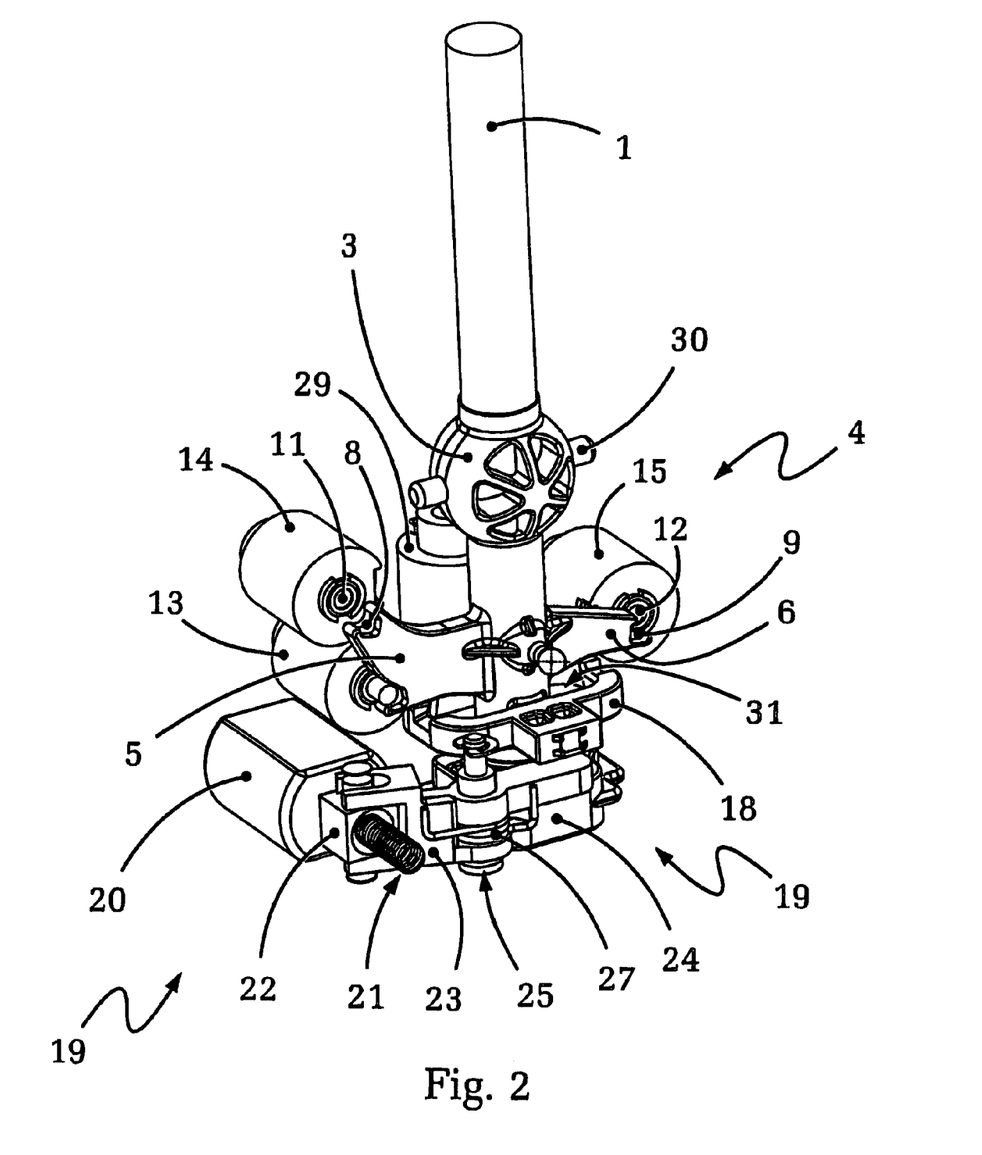
FIG. 2 the selector lever, locking device, and actuator device of the operating device according to FIG. 1, in a depiction and view that correspond to FIG. 1, with the housing base removed.

FIG. 2 shows, once more, the arrangement composed of selector lever 1 and locking device 4 according to FIG. 1, wherein housing 2 was omitted from the representation in FIG. 2. As a result, it is much easier to see electromagnetic actuators 13, 14, 15 in particular, which are used to move locking stops 10, 11, 12. Furthermore, in contrast to FIG. 1, FIG. 2 also shows actuator device 19 which is used to actuate return of selector lever 1 from the tip gate to the selection gate. Actuator device 19 comprises an electric motor 20, on the output shaft of which a threaded spindle 21 is disposed. A spindle nut 22 moves on threaded spindle 21 and acts via an actuator lever 23, 24 on the lower end of selector lever 1. Actuator lever 23, 24 is supported on a pivot axis 25.

Figure 3:
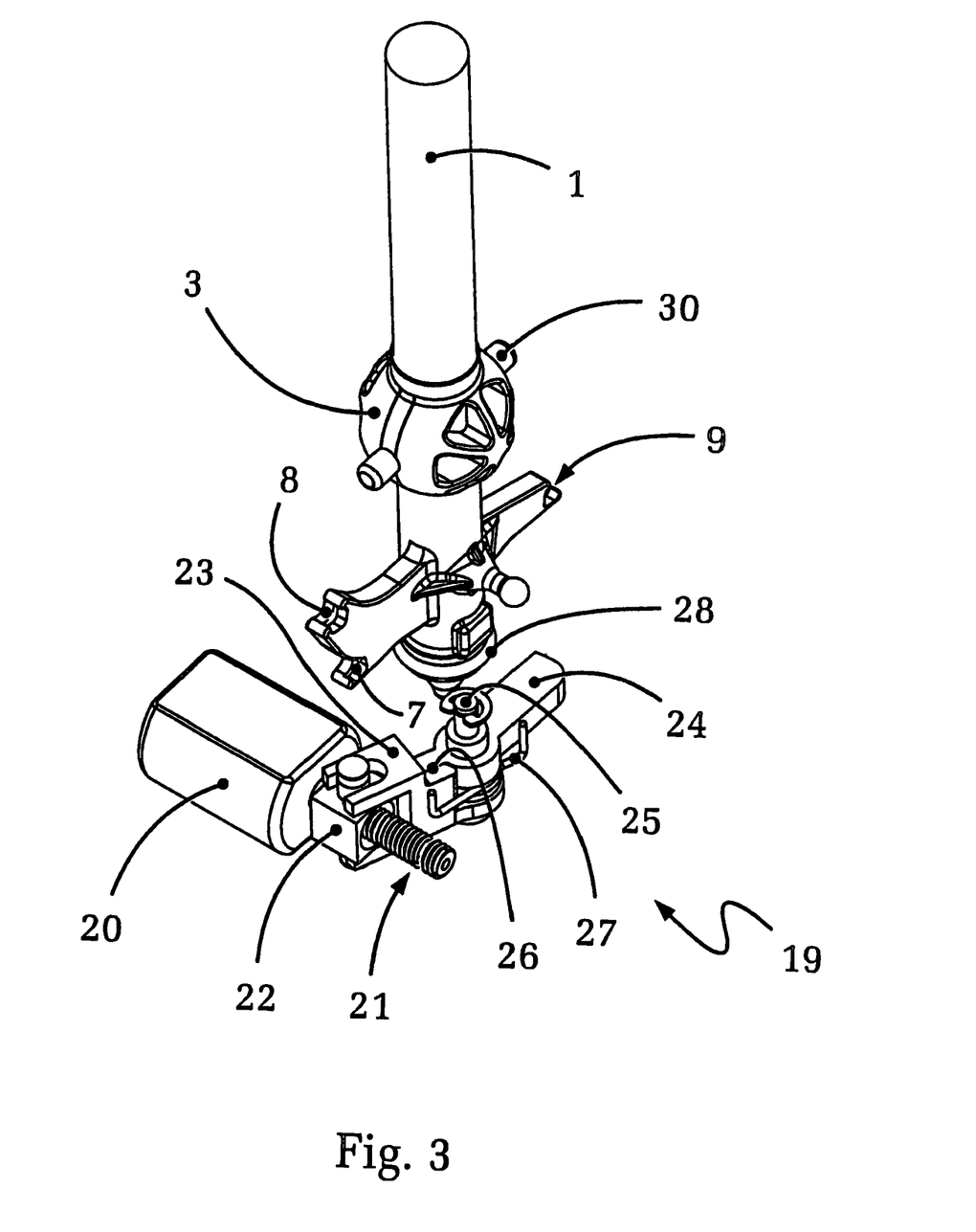
FIG. 3 an oblique view of the selector lever and actuator device of the operating device according to FIGS. 1 and 2, in a depiction that corresponds to FIG. 1, with the locking actuator system removed.

As clearly seen in FIG. 3, actuator lever 23, 24 is composed of two pieces, where drive half 23 and output half 24 are both supported on common pivot axis 25. A stop 26 that acts as a freewheel is disposed between drive half 23 and output half 24. Freewheel stop 26 is preloaded by freewheel spring 27.

Selector lever 1 can therefore be transferred actuatorically from its tip gate position (see FIG. 4) into the selector gate position (see FIG. 5) using actuator device 19-27. If, at the same time, selector lever 1 is accidentally fixed or is blocked by an object, spring-loaded freewheel stop 26, 27 prevents actuator device 19-27 from becoming overloaded or damaged by merely preloading freewheel spring 27 instead of a movement of selector lever 1. As soon as selector lever 1 is again released, selector lever 1 is automatically returned from the tip gate position (see FIG. 4) to the selection gate position (see FIG. 5) due to the actuating energy of actuator device 19-27 stored in freewheel spring 27. To ensure that the motion of selector lever 1 returning from the tip gate to the selection gate is as quiet as possible, selector lever 1 includes, on its lower end, an elastomer-coated edge or elastic ring 28, against which output half 24 of actuator lever 23, 24 can be brought to a stop.

Figure 4:
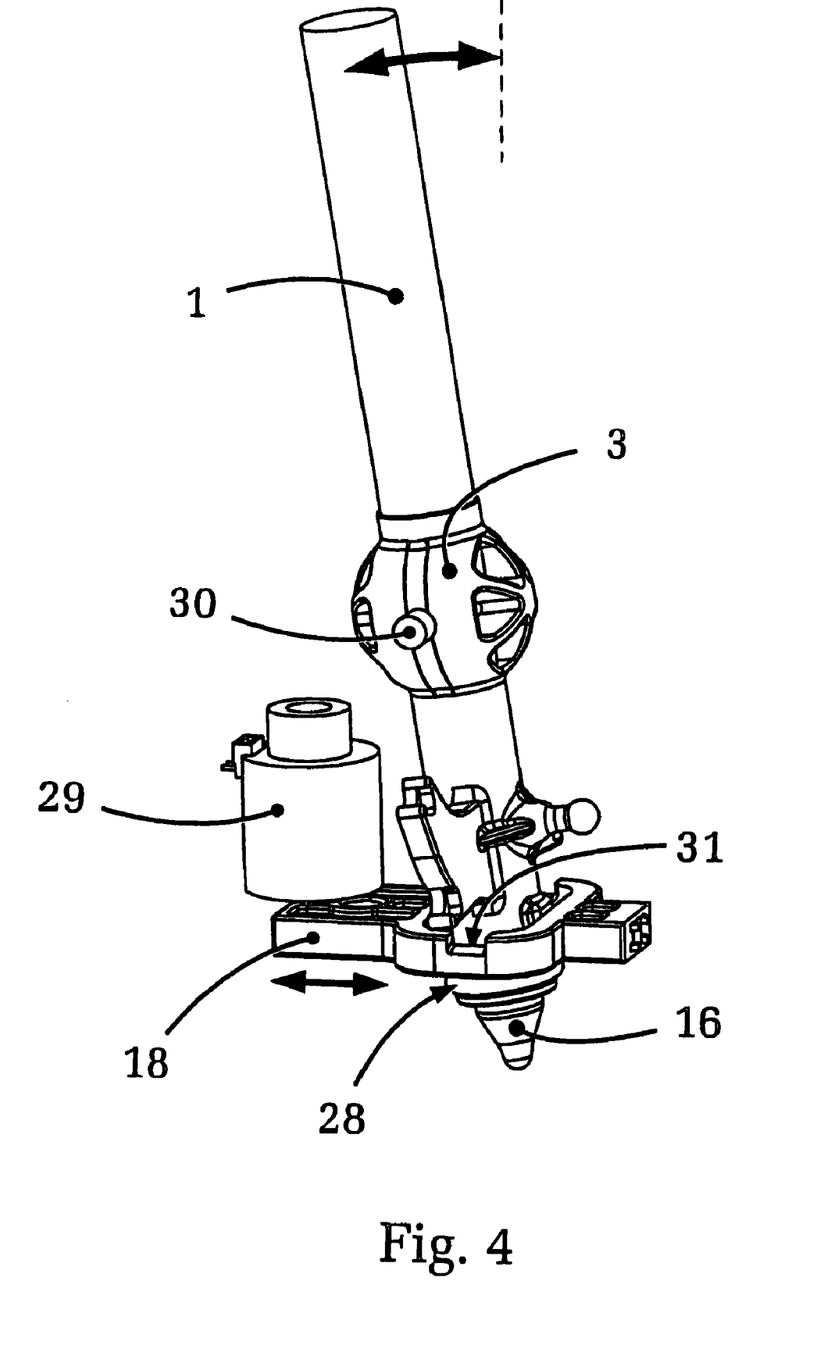
FIG. 4 the selector lever and locking slide of the operating device according to FIGS. 1 through 3, in a depiction that corresponds to FIGS. 1 through 3, with the selector lever in the tip gate.
Figure 5:
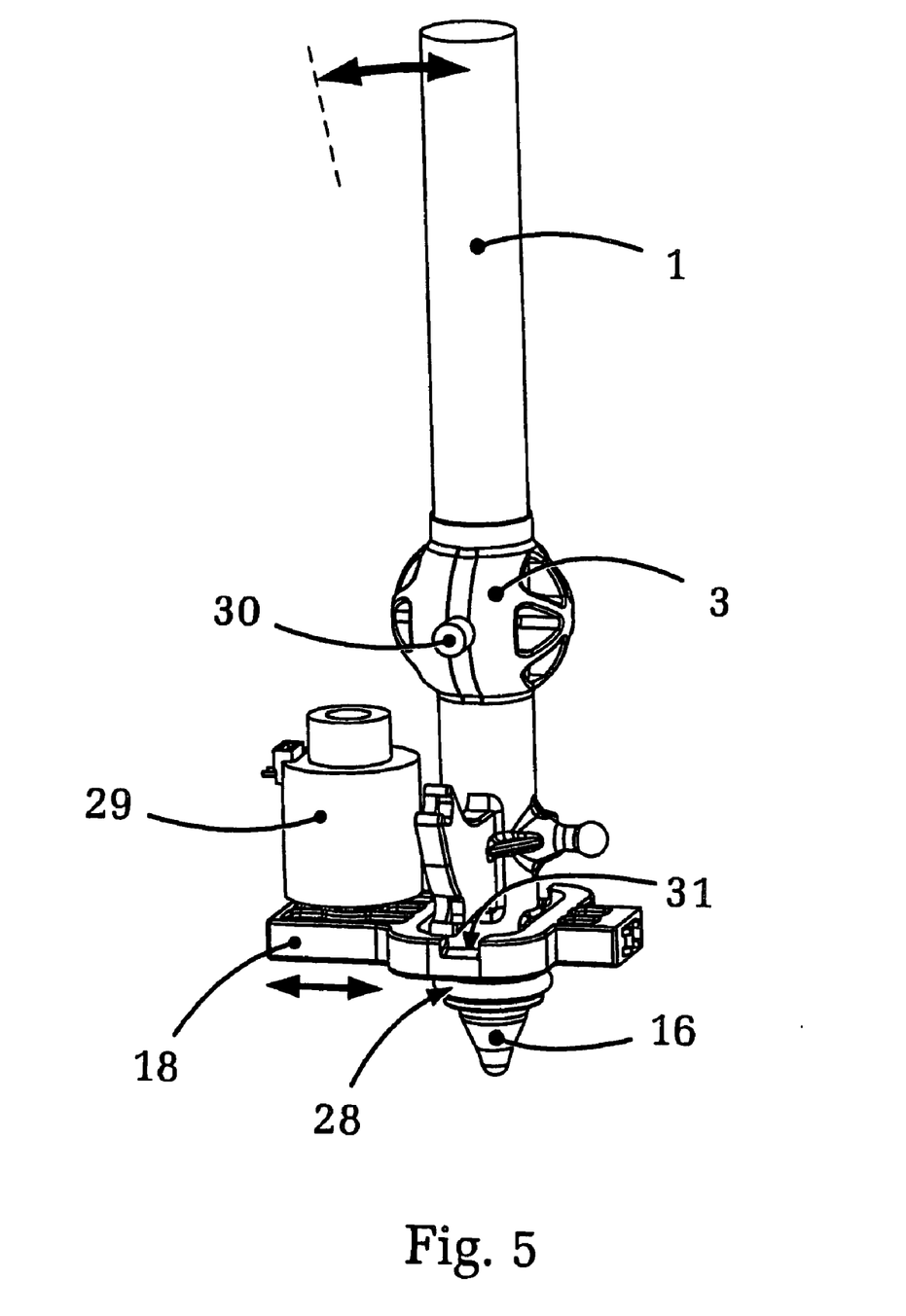
FIG. 5 the selector lever and locking slide according to FIG. 4, in a depiction and view that correspond to FIG. 4, with selector lever in the shift gate.

Finally, the possibility to actuate locking of the swiveling motion of selector lever 1 out of the selection gate position (FIG. 5) and into the tip gate position (FIG. 4) is depicted in FIGS. 4 and 5. Locking slide 18 is clearly shown, in particular (see also FIGS. 1 and 2). Locking slide 18 is accommodated and guided in a horizontally displaceable manner in corresponding straight guides of the housing halves of base 2 (not shown here) of the operating device. For coupling to selector lever 1, locking slide 18 includes a slotted recess 31 (see also FIG. 2), in which selector lever 1 can move freely forward or backward along its main direction of motion, while, simultaneously, the lateral swiveling motions of selector lever 1 between the tip gate and the selection gate and the corresponding linear displacement of locking slide 18 are coupled by the broadsides of recess 31.

To prevent the swiveling motion of selector lever 1 out of the selection gate (FIG. 5) into tip gate (FIG. 4) depending on the current driving condition of the vehicle or depending on the gear selection position that is engaged in the transmission at the moment, the armature pin (which is hidden by locking slide 18 in FIG. 5) of electromagnetic actuator 29 is extended downward, where it engages in a corresponding recess in locking slide 18. To release the lock on the lateral motion of the selector lever out of the selector gate position shown in FIG. 5, the armature pin of actuator 29 is retracted and, after selector lever 1 swivels about journal 30, the situation shown in FIG. 4 results.

In summary, it is therefore clear that the invention provides an operating device having a locking assembly that includes the particular advantage over the prior art that it functions using a relatively simple design, even when blocking tasks are complex. Substantial advantages are attained in the form of minimal noise production and short shift times. Furthermore, undefined operating states can be reliably prevented, and likewise jamming of the selector lever, which can occur due to simultaneous movement of the selector lever and activation of the locking device can be reliably prevented. Finally, the range of motion of the selector lever can be positioned in a largely free manner to suit the particular operating state of the gear shifting transmission.

In this manner, the invention enables—in particular in regards to monostable operating devices—the driver to be provided with reliable tactile feedback about the actual gear state and the actuating options that are currently available e.g. with an automatic transmission. Due to the simple design and high reliability, the invention makes an important contribution to the improvement of the operator comfort, ergonomics, cost effectiveness, and safety of operating devices for motor vehicle transmissions.

LIST OF REFERENCE NUMERALS

1 Selector lever
2 Base
3 Pivot support
4 Locking device, locking assembly
5, 6 Locking cantilever 7, 8, 9 Locking contour, locking recess
10, 11, 12 Locking armature
8a Elastomeric insert
13, 14, 15 Locking actuator
16 Interlock pin
17 Notched gate
18 Locking slide
19 Actuator device
20 Electric motor
21 Threaded spindle
22 Spindle nut
23, 24 Drive half, output half, actuator lever
25 Pivot axis
26 Freewheel stop
27 Freewheel spring
28 Elastomer ring
29 Locking actuator
30 Journal
31 Slotted recess

The invention claimed is:

1. An operating device for selecting a fixed gear ratio of a gear shifting transmission, the operating device comprising:
a selector lever (1) being movable between at least three gear selection positions; and
a locking device (4) for limiting a range of motion of the selector lever (1), for excluding certain selector-lever positions, and for blocking the selector lever (1);
wherein the locking device (4) includes a cantilever assembly (5, 6), having a plurality of locking contours (7, 8, 9) that are each connected to the selector lever, each of the locking contours (7, 8, 9) is assigned to a selector lever position and is engaged with a respective actuator activatable locking element (10, 11, 12) which forms a motion stop for the selector lever (1).

2. The operating device according to claim 1, wherein the locking elements are extendable bolts (10, 11, 12) of actuators (13, 14, 15).

3. The operating device according to claim 1, wherein the locking elements are movable armatures (10, 11, 12) of electromagnets (13, 14, 15).

4. The operating device according to claim 1, wherein the cantilever assembly (5, 6) is designed as one-piece with a shank of the selector lever (1).

5. The operating device according to claim 1, wherein a cross slide (18) is disposed displaceably transversely to a main actuation direction of the selector lever (1) and has a slot (31), in a base region (2) of the operating device, which encloses the selector lever (1), and the cross slide (18) is blocked by a locking actuator (29).

6. The operating device according to claim 1, wherein an actuator device (19) is provided for actuating a return of the selector lever (1) from a tip gate to a selection gate.

7. The operating device according to claim 6, wherein the actuator device (19) has one of a segment worm gear or a spindle gear (21, 22).

8. The operating device according to claim 6, wherein the actuator device (19) has a spring (27) which loads a freewheel (26), and the freewheel (26) and the freewheel spring (27) act in a direction of actuation of the actuator device (19).

9. The operating device according to claim 1, wherein the selector lever (1) is monostable.

10. The operating device according to claim 6, wherein the locking contours (7, 8, 9) have elastomeric stop dampers (8a).

11. An operating device for selecting a fixed gear ratio of a gear shifting transmission, the operating device comprising:
a selector lever (1) being shiftable between at least three gear selection positions; and
a locking device (4) for limiting shifting motion of the selector lever (1) and prevent the selector lever (1) from shifting into certain selector-lever positions, the locking device (4) includes a cantilever assembly (5, 6) having a plurality of locking contours (7, 8, 9) that are each connected to the selector lever (1), and each of the locking contours (7, 8, 9) being associated with a selector lever position and engaging a respective actuator activatable locking element (10, 11, 12) for forming a motion stop for the selector lever (1).

* * * * *